United States Patent
Langeveld

(12) 
(10) Patent No.: US 6,279,608 B1
(45) Date of Patent: Aug. 28, 2001

(54) CONNECTION FOR CONNECTING A MEASURING DEVICE TO A GAS UNIT

(75) Inventor: Jacobus F. A. Langeveld, Ede (NL)

(73) Assignee: Kamstrup B.V., Doesburg (NL)

( * ) Notice: Subject to any disclaimer, the term of this patent is extended or adjusted under 35 U.S.C. 154(b) by 0 days.

(21) Appl. No.: 09/623,678

(22) PCT Filed: Mar. 10, 1999

(86) PCT No.: PCT/NL99/00134

§ 371 Date: Sep. 7, 2000

§ 102(e) Date: Sep. 7, 2000

(87) PCT Pub. No.: WO99/46530

PCT Pub. Date: Sep. 16, 1999

(30) Foreign Application Priority Data

Mar. 11, 1998 (NL) .................................................. 1008557

(51) Int. Cl.[7] ...................................................... F16L 55/18
(52) U.S. Cl. ........................ 137/557; 137/322; 137/883; 251/149.4; 251/149.5
(58) Field of Search ..................................... 137/557, 883, 137/559, 320, 322; 251/149.5, 149.4

(56) References Cited

U.S. PATENT DOCUMENTS 2,218,318  * 10/1940  Fauser ................................. 251/149.4
2,775,256  * 12/1956  Hanson ................................. 137/322
2,881,011  *  4/1959  Coughlin .
2,918,086  * 12/1959  Eich .
2,923,312  *  2/1960  Wagner .
5,787,916  *  8/1998  Shaw ..................................... 137/557

* cited by examiner

Primary Examiner—A. Michael Chambers
(74) Attorney, Agent, or Firm—Banner & Witcoff, Ltd.

(57) ABSTRACT

The invention relates to a connection for connecting a measuring device (6) to a gas pipe, comprising: a connecting element (1) for arranging in the gas pipe which divides the gas pipe into a first and a second piece (2, 3); a connecting plug (4) which can be coupled to the connecting element and which is connected to the measuring device by means of a measuring line (5), wherein the connecting element comprises a valve which is actuable by the connecting plug and which normally mutually connects the first and the second piece of the gas pipe and which, when the connecting plug is coupled to the connecting element, connects the first piece of the gas pipe to the measuring line and closes the second piece of the gas pipe. As a result of these measures the valve is operated by the connecting plug, so that opening and closing of taps is no longer necessary. The operation of such a connection is therefor greatly simplified. A perhaps even more important advantage lies in the fact that safety is ensured, since when the connecting plug is removed the measuring line is automatically closed.

12 Claims, 2 Drawing Sheets

CONNECTION FOR CONNECTING A MEASURING DEVICE TO A GAS UNIT

BACKGROUND OF THE INVENTION

The present invention relates to a connection for connecting a measuring device to a gas unit.

Such connections are generally known.

Such a known connection is formed by a T-piece which is arranged in a gas pipe and wherein a tap is incorporated in at least one of the connections for the gas pipe, just as in the branch leading outward. To carry out a measurement a measuring instrument can be connected onto the outward leading branch, whereafter the tap present therein can be opened.

The other tap can be opened or closed depending on the type of measurement to be performed.

Connecting of a measuring device to such a connection requires a great deal of work, while the risk of erroneous measurement and of unsafe situations, for instance during removal of the measuring device when a tap is open, is very great.

BRIEF DESCRIPTION OF THE INVENTION

The object of the present invention is to provide such a connection which requires fewer operations during connection and disconnection, and wherein safety is ensured.

This object is achieved by such a connection, which comprises:

- a connecting element for arranging in the gas pipe which divides the gas pipe into a first and a second piece;
- a connecting plug which can be coupled to the connecting element and which is connected to the measuring device by means of a measuring line, wherein the connecting element comprises a valve which is actuable by the connecting plug and which normally mutually connects the first and the second piece of the gas pipe and which, when the connecting plug is coupled to the connecting element, connects the first piece of the gas pipe to the measuring line and closes the second piece of the gas pipe.

As a result of these measures the valve is operated by the connecting plug, so that opening and closing of taps is no longer necessary. The operation of such a connection is therefore greatly simplified.

A perhaps even more important advantage lies in the fact that safety is ensured, since when the connecting plug is removed the measuring line is automatically closed.

It is important here that the connecting plug be inseparably connected to the measuring device, which will take place in most cases by means of a hose. The connecting plug is then connected by means of the cord to the measuring device for instance by means of a pressure clip or other permanent connection.

A structurally attractive embodiment is created when the valve comprises a valve body which is normally pressed against a first seat by a spring, whereby the first gas pipe is sealed in relation to the measuring line and the first and the second piece of the gas pipe are mutually joined; and that when the connecting plug is coupled to the connecting element the body is moved off the first seat onto the second seat by an actuating element mounted on the connecting plug, whereby the first piece of the gas pipe is sealed relative to the second piece of the gas pipe and the first piece of the gas pipe is connected to the measuring line.

This results in a simple, structurally attractive solution.

According to another embodiment the valve is adapted during coupling of the connecting plug to initially break the connection between the first piece and the second piece of the gas pipe and to subsequently couple the first piece of the gas pipe to the measuring line.

This is the most desirable configuration for the most frequently occurring types of measurement; the other configuration, wherein the first piece of the gas pipe is initially coupled to the measuring line and the connection between the first piece and the second piece of the gas pipe is subsequently broken, is however in no way excluded from the invention; this may be advantageous for particular applications.

A further attractive embodiment results when the connecting plug can be fixed onto the connecting element by means of a screw thread. A screw thread does after all result in a connection which is always firm, wherein it is not necessary to apply much force. The danger of such a connection becoming disconnected is virtually precluded.

According to yet another preferred embodiment the connecting plug comprises a sleeve which is provided with screw thread and which is rotatable relative to the measuring line. This enables arranging of the screw connection by rotating the sleeve, wherein the measuring line does not have to co-rotate.

The measure of claim 6 therefore results in a structurally attractive embodiment.

The option of the screw thread on the connecting element being external provides the possibility of applying sufficient force to the connecting plug when it is being arranged on the connecting element; it is then not necessary to arrange a separate component on the connecting plug in order to transfer the force of the user onto the screw thread.

According to the invention a closure cap can further be screwed onto the connecting element in order on the one hand to protect the screw thread thereof during for instance painting operations, while such a closure cap can on the other hand be provided with an indicator element for indicating the position of the valve. This provides additional safety, since if the valve were not to return to its original position this would be indicated by the indicator element.

Other possible attractive preferred embodiments are stated in the remaining sub-claims.

BRIEF DESCRIPTION OF DRAWINGS

The present invention will be elucidated hereinbelow with reference to the annexed figures, in which.

DETAILED DESCRIPTION OF THE INVENTION

Figure 1:
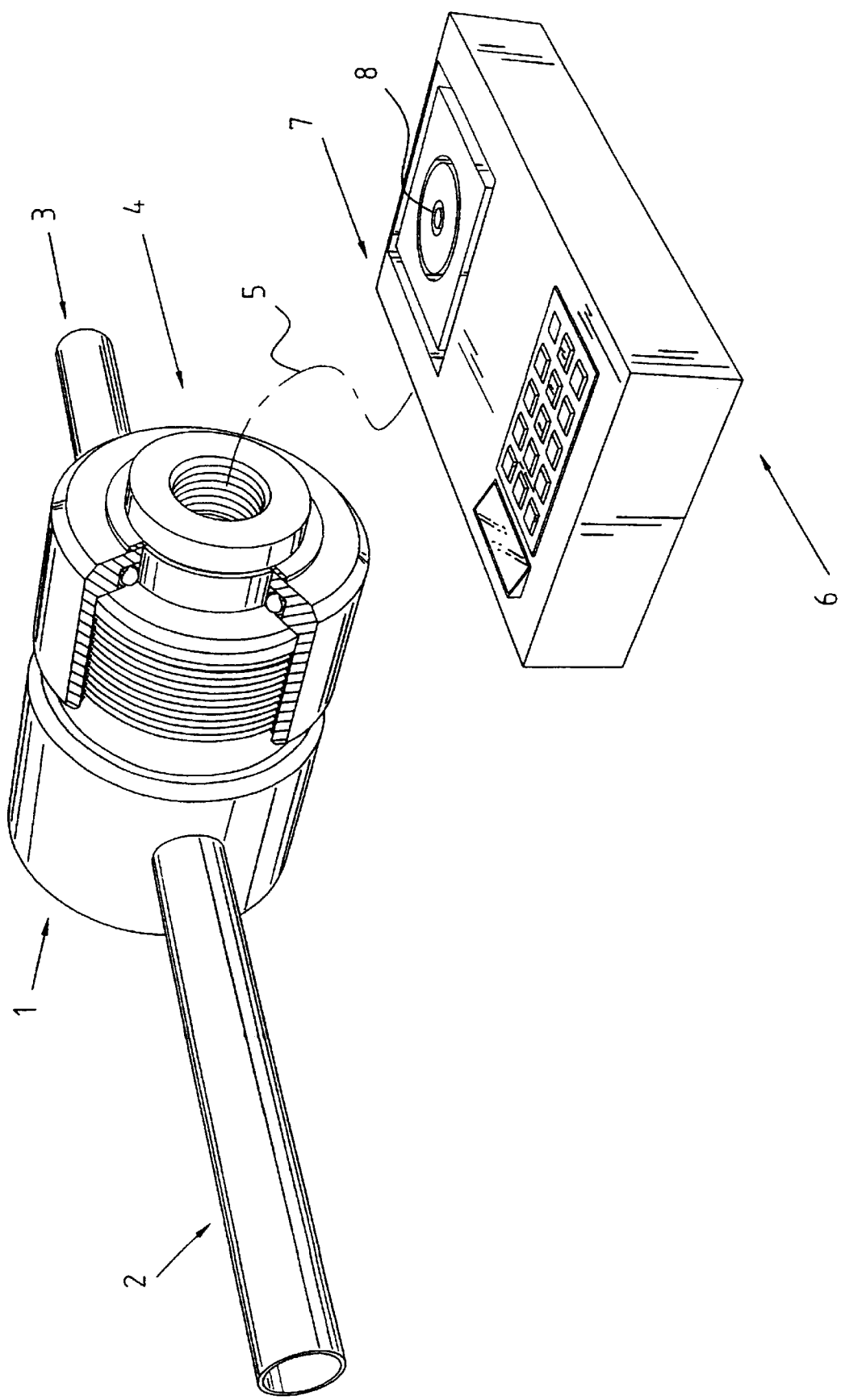
FIG. 1 shows a perspective view of a situation in which the connection according to the present invention is applied.
Figure 4:
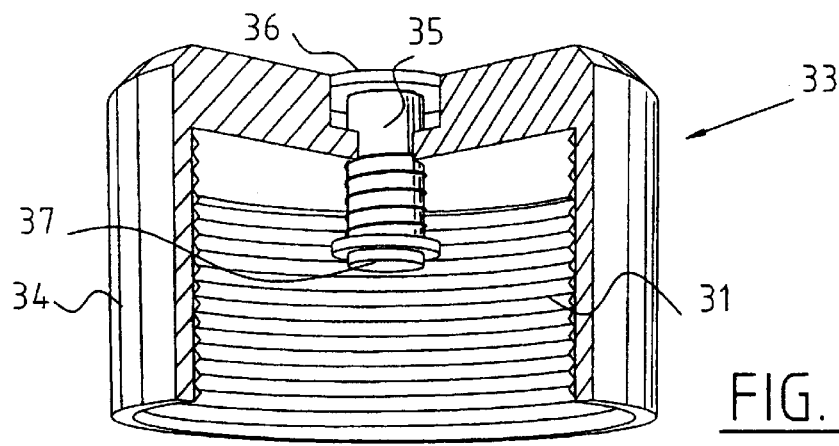
FIG. 4 shows a cross-sectional view of a closure cap with indicator according to the present invention.

As shown in FIG. 1, a connecting element 1 according to the present invention divides a gas pipe into a first piece 2 and a second piece 3.

Screwed onto connecting element 1 is a connecting plug 4 which is connected by means of a hose 5 to a measuring instrument 6. Hose 5 is fixedly connected to both connecting plug 4 and to measuring instrument 6. This latter is provided with a cover 7 in which is arranged a stopper 8 onto which connecting plug 4 can be screwed when measuring instrument 6 is not in use.

Figure 2:
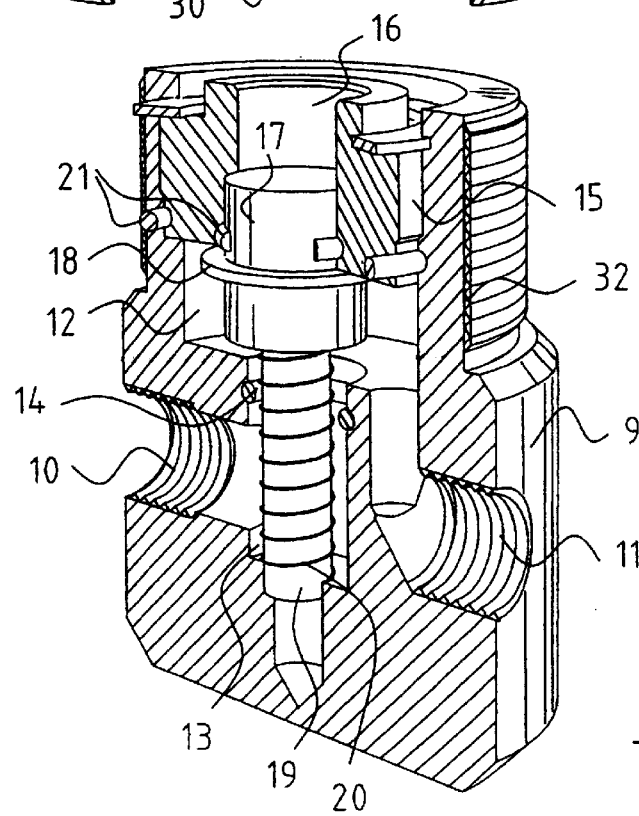
FIG. 2 shows a cross-sectional view of a connecting element according to the present invention.

The construction of connecting element 1 will be further elucidated below with reference to FIG. 2. Connecting element 1 is formed by a substantially cylindrical body 9 in which diverse bores are arranged, including a first bore 10 for connection to the first piece 2 of the gas pipe and a second bore 11 for connection to the second piece 3 of the gas pipe. Screw thread is arranged in these bores for connection to both pieces 2, 3 of the gas pipe.

A central bore 12 is further arranged which is provided in the middle with a recessed portion 13 so that a valve seat 14 is formed. A further number of connecting channels are also arranged which are of less importance to the invention and the position of which is shown clearly in the drawing.

Into the upper part is screwed a cylindrical body with a bore 15, whereby a bore is per se made. Into the thus formed structure is arranged a valve body 17 which is movable in axial direction. Valve body 17 comprises a shoulder 18 and a pin 19 which serves to guide the valve body. Arranged around pin 19 is a spring 20 which urges the valve body to the position shown in FIG. 2. In this position the bore 16 is closed and bores 10, 11 are mutually connected by means of the relevant channels. Shoulder 18 herein has the function of bounding the stroke of the valve body resulting from the spring pressure. Sealing rings 21 are arranged to improve sealing.

Conversely, when the valve body is moved to the other position the valve body 17 will close bore 10 relative to bore 11 by means of sealing ring 14. Bore 11 is also connected to bore 16 because valve body 17 moves so far downward that a passage is created between bore 12 and bore 16.

The axial length of valve body 17 is chosen such that in the shown embodiment the bore 10 is closed before bore 11 is connected to bore 16. A reverse sequence can be achieved with a different dimensioning of the components.

Figure 3:
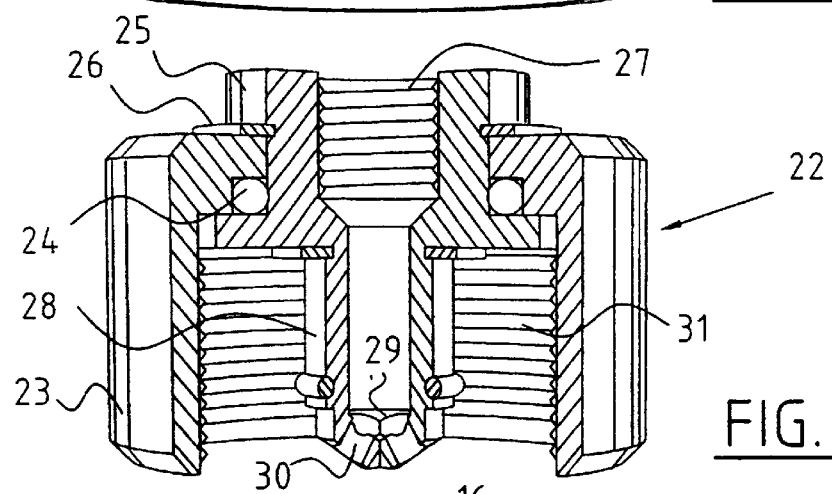
FIG. 3 shows a cross-sectional view of a connecting plug according to the present invention.

FIG. 3 shows a connecting plug 22. This comprises a sleeve-like body 23 which is connected by means of a rolling bearing 24 to a cylindrical body 25. Both components 23 and 25 are locked relative to each other by means of a locking ring 26, wherein mutual rotation is possible as a result of rolling bearing 24. A bore 27 is arranged in cylindrical body 25, while a protrusion 28 is also arranged which is provided with a recessed bore 29. Continuous bores 30 are further arranged in a chamfered end face of the protrusion.

The inner side of the sleeve is further provided with internal screw thread 31. This corresponds with the external screw thread 32 arranged on the outer side of body 9.

When the connecting plug is screwed onto the connecting element by means of screw thread 31, 32 the protrusion 28 will cause valve body 17 to move counter to the spring pressure of spring 20 to the second position, thus effecting the desired situation. The gas in bore 11 can herein reach bore 27 via inter alia openings 30. The different cross-sections are for instance dimensioned such that the required measurements can be carried out.

A reliable, safe and structurally attractive connection is thus obtained.

It will be apparent that the connection can be manufactured from diverse materials. It is important to prevent corrosion and other adverse effects by manufacturing the connection in for instance stainless steel or aluminium. In the latter case an additional surface treatment is necessary. Finally, the present invention provides a closure cap 33 which can be screwed onto connecting element 1. Similarly to connecting plug 22, closure cap 33 comprises a substantially sleeve-like body 34 which is provided on its inner side with screw thread 31. In the end face is arranged a bore into which an indicator element is arranged in the form of a pin 35. This pin 35 is provided on the outside with a shoulder 36 and a nut 37 is screwed onto the pin on its inside for fixation purposes. When closure cap 33 is screwed onto a connecting element 1 the pin 35 indicates the position of the valve body and therefore the fact of whether the connection for the measuring instrument is opened or closed. It is noted here that also in a horizontal axial position of the connection an unsafe situation is in any case indicated by inward movement of pin 35.

What is claimed is:

1. Connection for connecting a measuring device to a gas pipe, comprising:

a connecting element positioned in the gas pipe said element dividing the gas pipe into a first and a second piece;

a plug removable coupled to the connecting element said plug being connected to the measuring device by means of a measuring line;

said connecting element comprising a valve actuable by the plug, said element connecting the first and the second piece of the gas pipe when said plug is removed when the connecting plug is coupled to the connecting element, connects the first piece of the gas pipe to the measuring line and closes the second piece of the gas pipe.

2. Connection as claimed in claim 1, characterized in that:

the valve comprises a valve body which, when the plug is removed is pressed against a first seat by a spring, whereby the first gas pipe is sealed in relation to the measuring line and the first and the second piece of the gas pipe are mutually joined; and when the plug is coupled to the connecting element the valve body is moved off the first seat onto a second seat by an actuating element mounted on the plug, whereby the first piece of the gas pipe is sealed relative to the second piece of the gas pipe and the first piece of the gas pipe is connected to the measuring line.

3. Connection as claimed in claim 2, characterized in that the valve is adapted during coupling of the plug to initially break the connection between the first piece and the second piece of the gas pipe and to subsequently couple the first piece of the gas pipe to the measuring line.

4. Connection as claimed in claim 2, characterized in that the plug can be fixed onto the connecting element by means of screw thread.

5. Connection as claimed in claim 1, characterized in that the valve is adapted during coupling of the plug to initially break the connection between the first piece and the second piece of the gas pipe and to subsequently couple the first piece of the gas pipe to the measuring line.

6. Connection as claimed in claim 5, characterized in that the plug can be fixed onto the connecting element by means of screw thread.

7. Connection as claimed in claim 1, characterized in that the plug can be fixed onto the connecting element by means of screw thread.

8. Connection as claimed in claim 7, characterized in that the plug comprises a sleeve which is provided with screw thread and which is rotatable relative to the measuring line.

9. Connection as claimed in claim 8, characterized in that the plug comprises a body fixed to the measuring line and formed integrally with the actuating element, to which body the sleeve is connected by means of a rolling bearing.

10. Connection as claimed in claim 9, characterized in that the screw thread on the connecting element is external.

11. Connection as claimed in claim 8, characterized in that the screw thread on the connecting element is external.

12. Connection as claimed in claim 7, characterized in that the screw thread on the connecting element is external.

* * * * *